United States Patent [19]
Ward, Jr.

[11] 3,736,826
[45] June 5, 1973

[54] APPARATUS FOR SHEARING UNIFORM CHARGES OF GLASS FROM A MOLTEN STREAM OF GLASS
[75] Inventor: William R. Ward, Jr., Columbus, Ohio
[73] Assignee: Owens-Illinois, Inc., Toledo, Ohio
[22] Filed: Dec. 28, 1971
[21] Appl. No.: 213,123

[52] U.S. Cl. .......................83/600, 74/42, 83/623, 83/526
[51] Int. Cl. ...............................B26d 5/08
[58] Field of Search....................83/600, 623, 526, 83/350, 356.2; 74/42, 43

[56] References Cited
UNITED STATES PATENTS

| 3,496,326 | 1/1970 | McNamara | 83/600 |
| 3,205,746 | 9/1965 | Copeland | 83/600 X |
| 2,977,718 | 4/1961 | Dahlman | 83/600 |
| 2,518,871 | 8/1950 | Craig | 83/600 |
| 1,953,030 | 3/1934 | Sterrett | 83/600 X |
| 1,524,638 | 1/1925 | Hiller | 83/623 |

Primary Examiner—Andrew R. Juhasz
Assistant Examiner—W. Donald Bray
Attorney—Harold F. Mensing and E. J. Holler

[57] ABSTRACT

A shearing apparatus for sequentially severing gobs of glass from the end of a vertically descending molten stream of glass at precisely controlled uniform intervals. A pair of arms having cooperating shear blades on their outer ends are pivotally mounted on a common shaft for swinging the blades into and out of contact with each other through arcuate paths of less than 180° in adjacent parallel planes. The blade arms are synchronously driven by connecting rods rotatably attached to eccentrics which are affixed to meshing spur gears powered by a rotary hydraulic motor drivingly connected to one of the gears. An abutment affixed to a rotatable member of the drive train cooperates with a releasable stop which is controlled by a timing means to start and stop the drive train once for each revolution of the abutment. A cam operated deceleration valve retards the motor speed during the latter portion of each cutting cycle.

6 Claims, 5 Drawing Figures

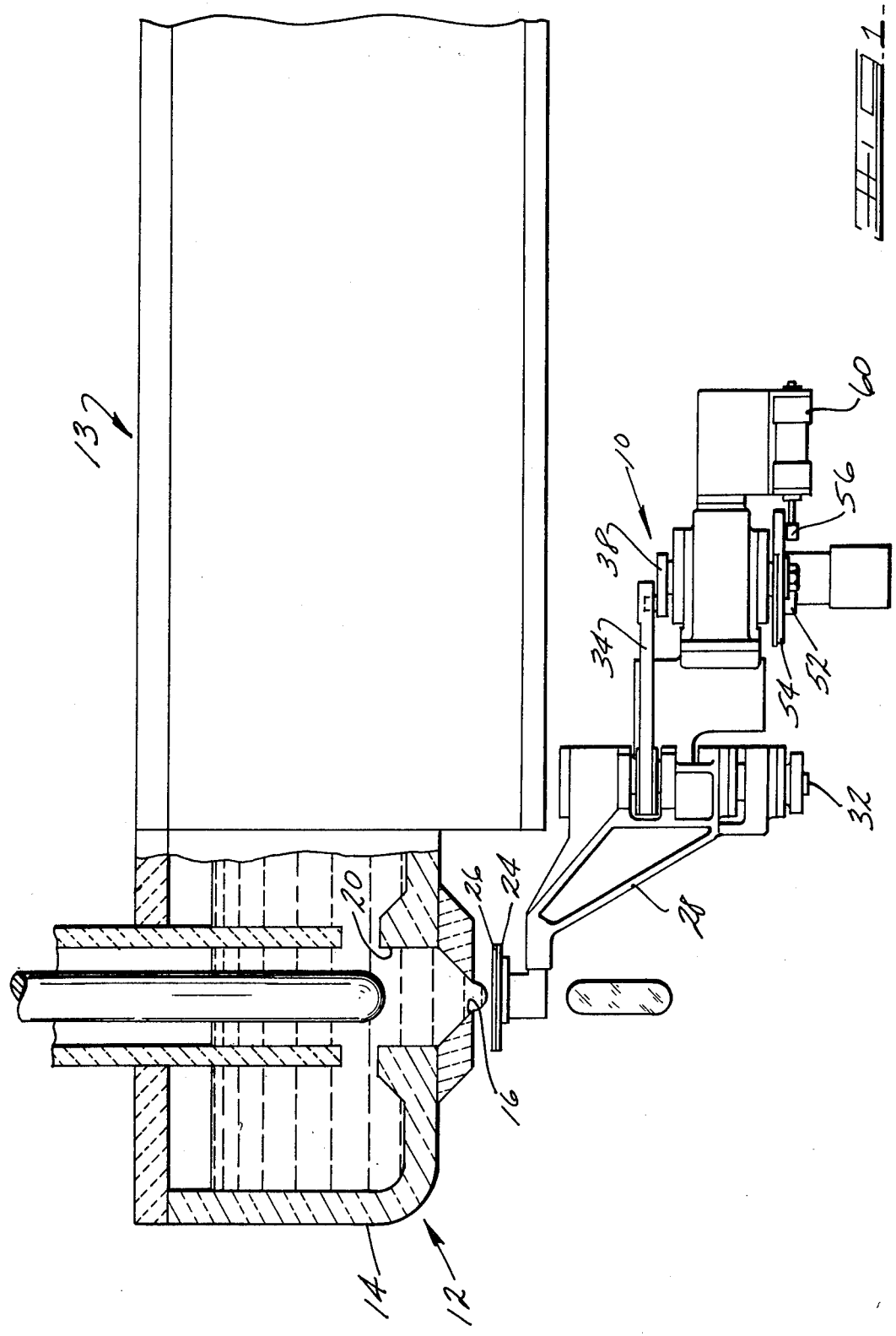

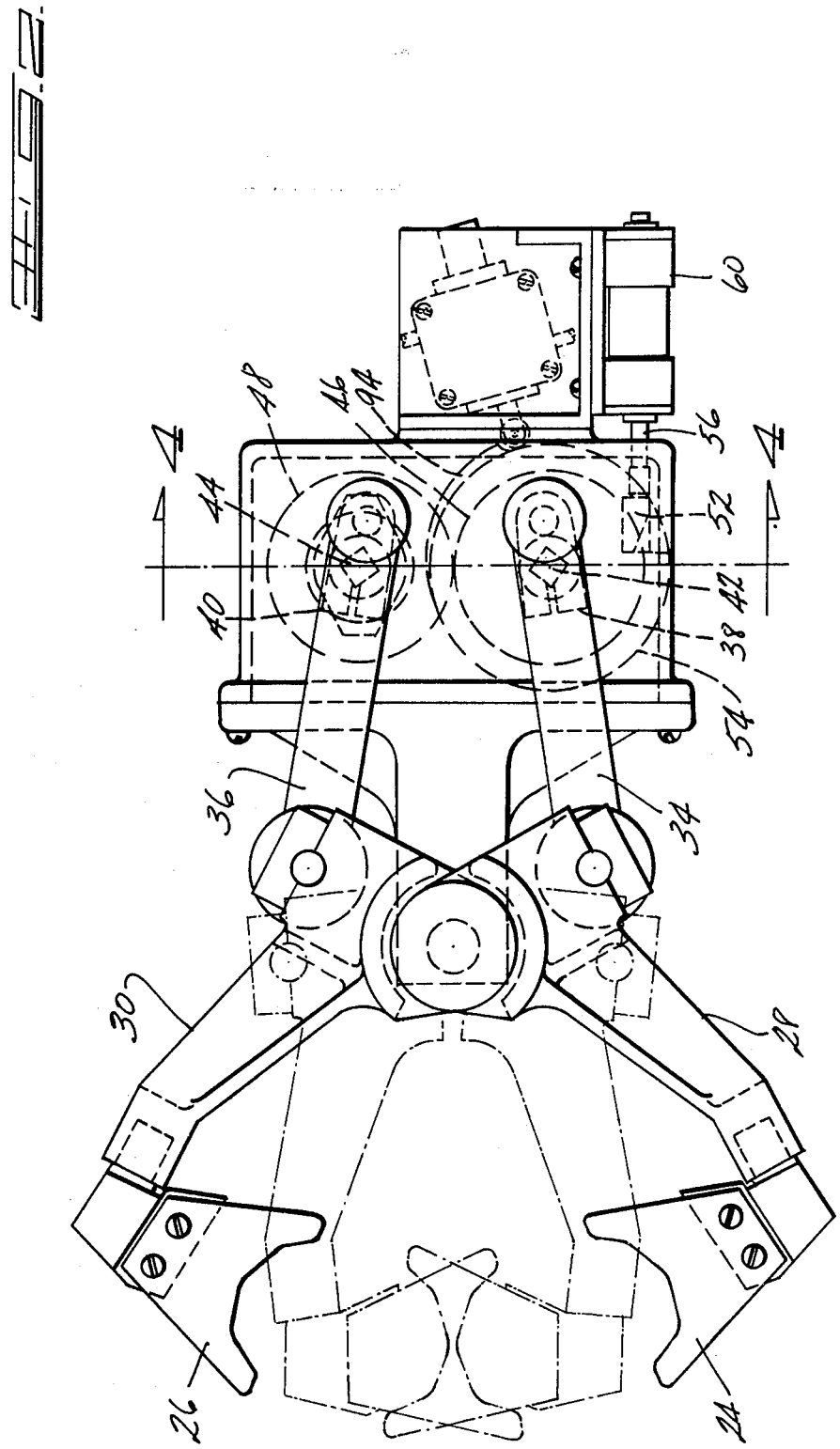

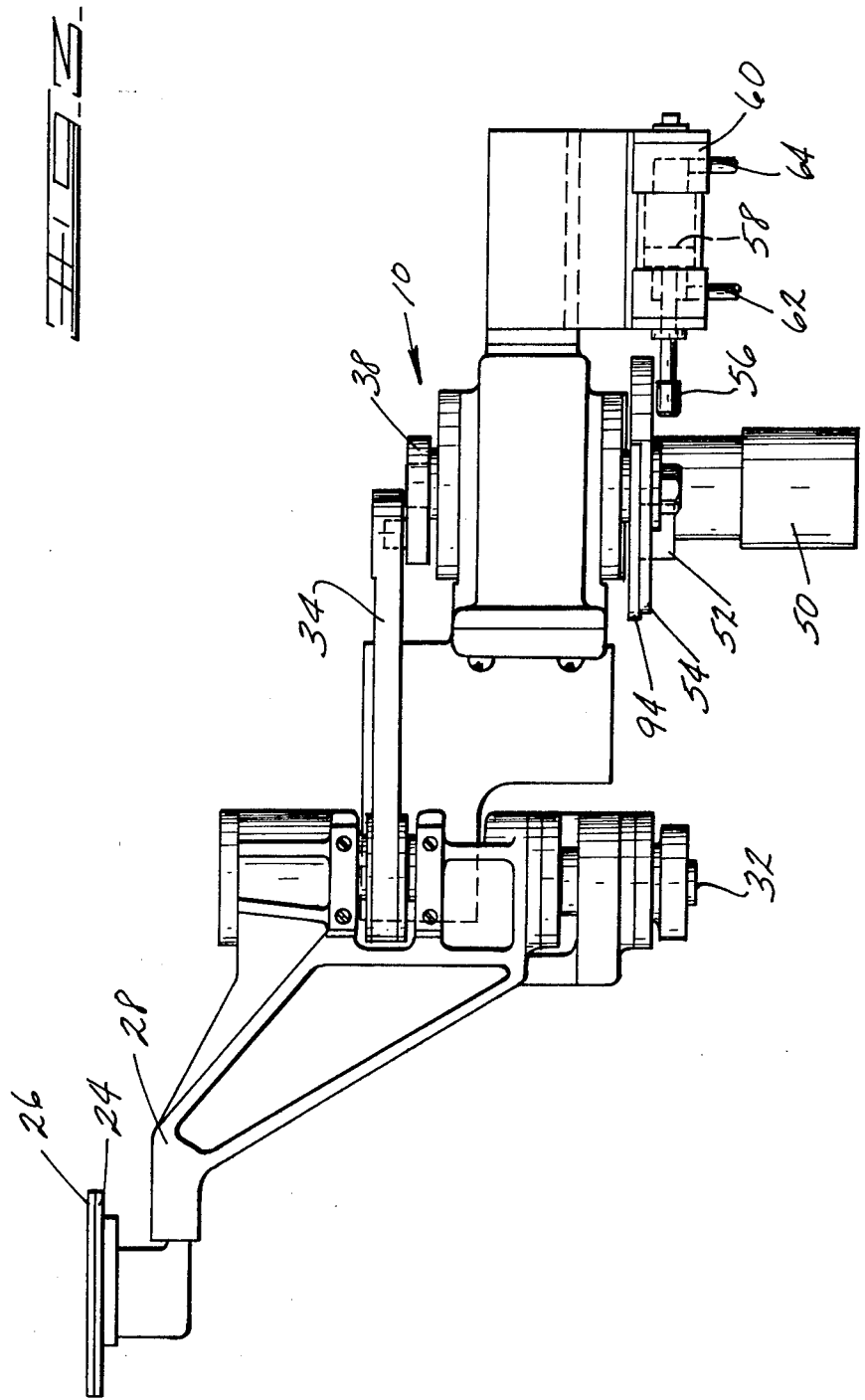

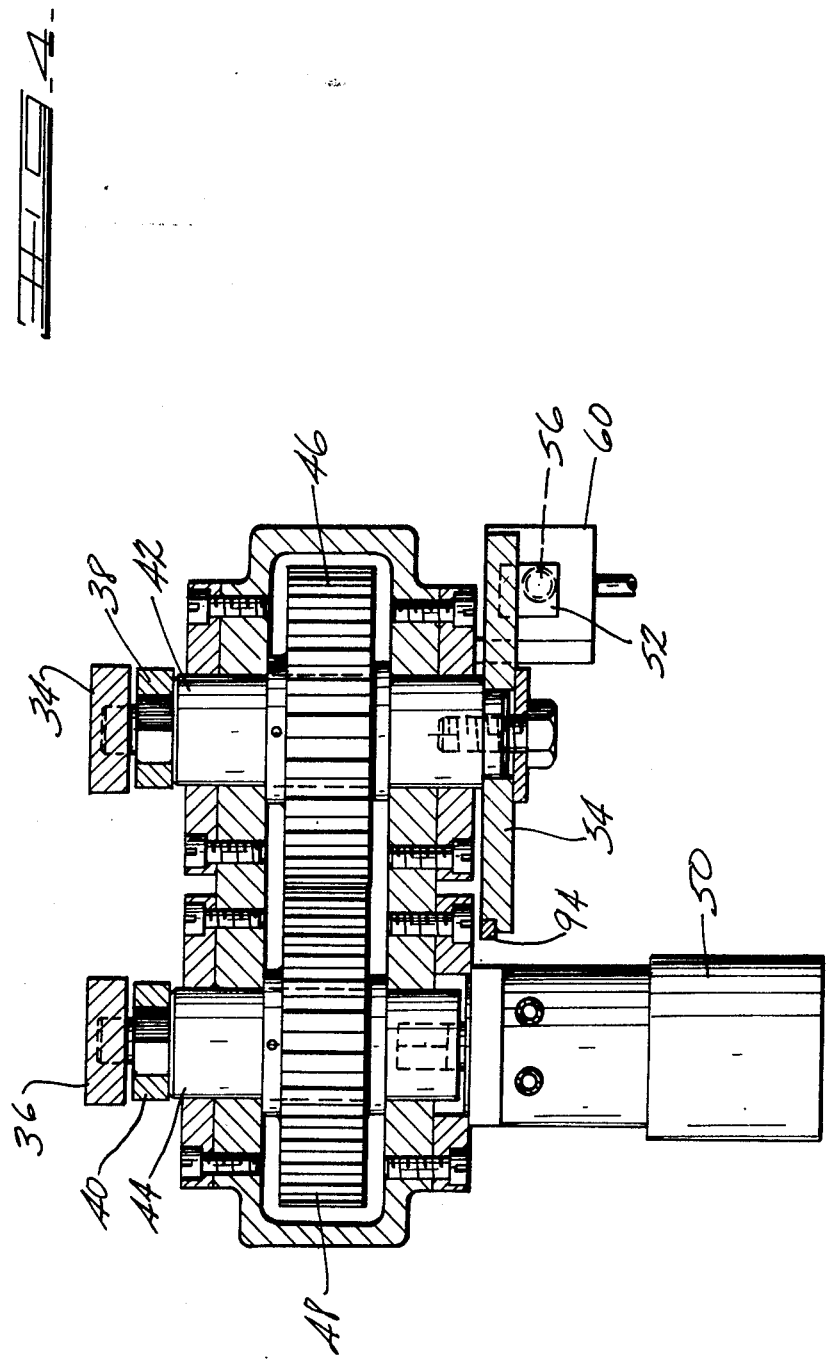

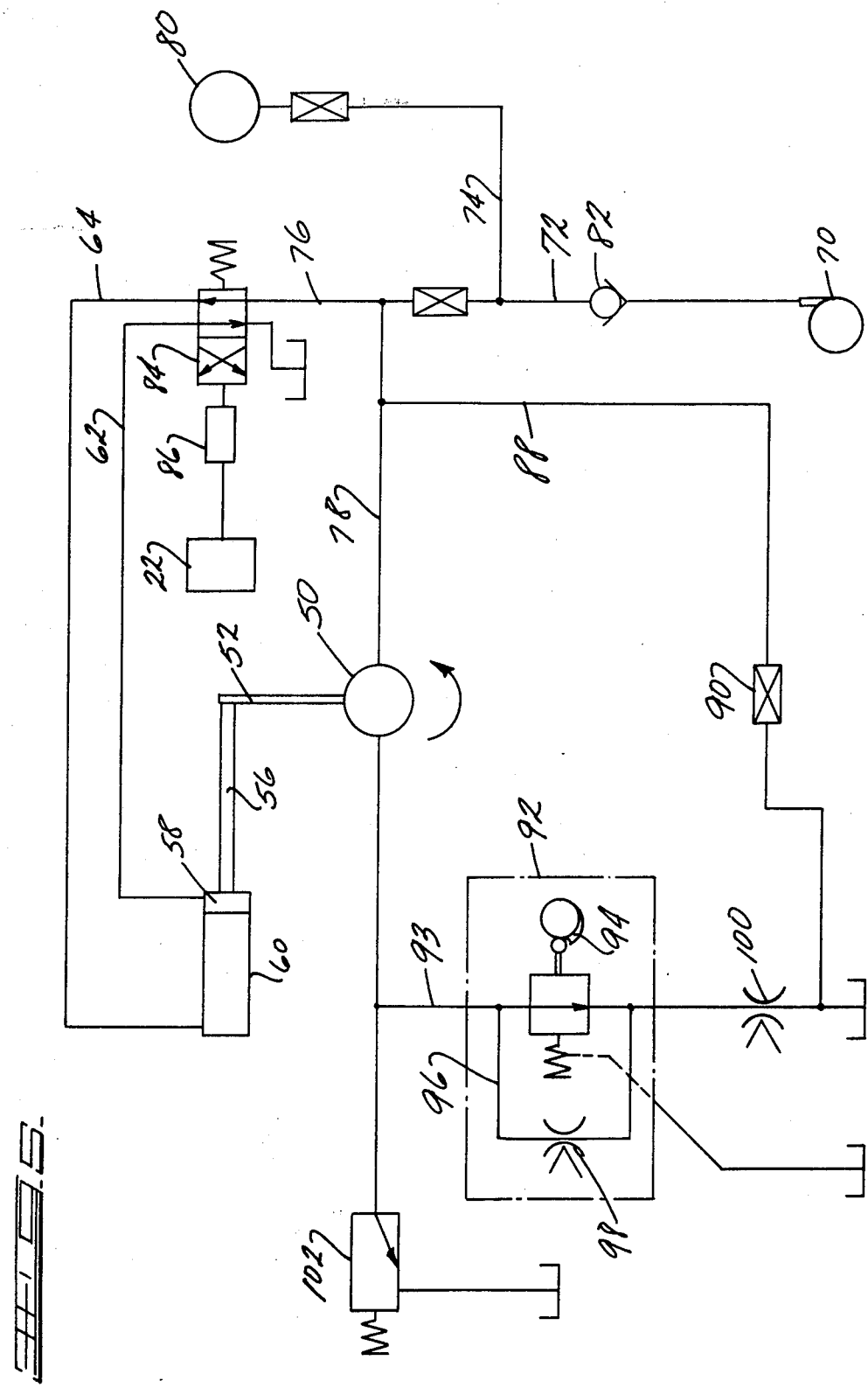

3,736,826

APPARATUS FOR SHEARING UNIFORM CHARGES OF GLASS FROM A MOLTEN STREAM OF GLASS

FIELD OF THE INVENTION

This invention relates to an oscillatory shearing apparatus for sequentially severing precisely uniformly sized gobs of glass from the end of a molten stream of glass descending vertically from the outlet orifice in a feeder bowl of a glass melting furnace. More specifically it relates to such an apparatus having a rotary powered drive train which cycles identically each time a cut is made rather than completing two cuts for each drive train cycle.

BACKGROUND OF THE INVENTION

In the mass production of formed glass articles it is important that the weight of the molten charges or gobs of glass delivered to a forming unit be precisely controlled. Many factors have a bearing on the total weight of each gob and the uniformity of the weights between gobs of a series. One of these factors is the timing of the shearing apparatus which severs a gob from the end of the glass stream descending from the outlet orifice in the bottom of a feeder bowl. Most of the prior art shearing apparatuses are powered by a reciprocating hydraulic cylinder and piston means. A complete shearing cycle stroke is performed on both a forward stroke and a rearward stroke of the piston. Thus successive shearing cycles are not performed by identical movements of the drive train. Such shearing devices require dual control means for timing the separate cutting cycles produced by the forward and the rearward strokes of the piston. As a practical matter it was found to be impossible to precisely match the cutting cycle of the forward stroke with that of the rearward stroke. To expediently alleviate the problem, cutting has been restricted to either the forward or the rearward stroke with a false cut being made with the other stroke. The false cut serves no purpose other than to reset the drive mechanism to the same selected one of its alternative starting positions after each cut. This requires an expenditure of energy and causes wear on the equipment and thus does not provide a satisfactory solution to the problem.

SUMMARY OF THE INVENTION

Generally speaking the shearing apparatus of this invention comprises a pair of cooperating shear blades connected to the free ends of a pair of supporting arms pivotally mounted on a common shaft. The arms are synchronously driven by connecting rods rotatably attached to eccentrics affixed to meshing spur gears. A continuously energized rotary hydraulic motor is drivingly connected to one of the gears. The drive train is designed so that each of its moving components travels through a complete and identical cycle each time a gob of glass is severed from the molten glass stream. An abutment affixed to one of the rotatable members of the drive train cooperates with a releasable stop means to start and stop the drive train movement. Preferably the releasable stop means comprises an hydraulic cylinder with a piston and rod assembly disposed in tangential alignment with the circular path of the abutment. A valve means is provided to momentarily withdraw the end of the piston rod from the path of the abutment and subsequently return it to its original position before one revolution of the abutment is completed. A timing means associated with the glass feeder system is used to actuate the valve means. A cam actuated deceleration valve is provided to retard the speed of the power unit during the latter portion of each cycle.

Accordingly it is a general object of this invention to produce a shearing apparatus for sequentially severing gobs of glass from a stream of molten glass at precisely controlled intervals without the need of a false cut. It is a more specific object of this invention to provide an oscillating shearing device powered by a continuously energized rotary drive means in which successive cycle movements of both the shear blades and the drive means are identical.

Other objects and advantages and the method of attaining them will be apparent from a reading of the following description of the invention made with reference to the accompanying drawings of a preferred embodiment thereof.

BRIEF DESCRIPTION OF THE DRAWINGS

FIG. 1 is an elevational view partially in section with parts broken away showing the shearing apparatus of this invention in conjunction with a glass feeder system of a glass furnace. The apparatus is shown in a closed position immediately after cut off.

FIG. 2 is an enlarged plan view of the shearing apparatus of FIG. 1 but with the shear arms in a fully open position.

FIG. 3 is an enlarged elevational view of the shearing apparatus of FIG. 1.

FIG. 4 is a sectional view taken along line IV—IV of FIG. 2 showing additional details of the drive train.

FIG. 5 is a schematic drawing of the hydraulic system for powering the shear drive motor and controlling the cycling of the drive train.

DETAILED DESCRIPTION OF THE INVENTION

In FIG. 1 of the drawings the shearing apparatus 10 of this invention is illustrated in conjunction with a lower portion of a molten glass feeder bowl assembly 12 attached to the front of a glass melting and refining furnace 13. Molten glass from the melting furnace is supplied to the feeder bowl 14 which has an outlet orifice 16 extending through its bottom. The outflow of glass through orifice 16 is controlled by a vertically reciprocable feeder plunger 18 loosely contained in a feeder tube section 20 axially aligned with the center of orifice 16. A power system regulates the periodic reciprocation of the feeder plunger 18 and the timing device 22 in synchronization.

The shearing apparatus 10 comprises a pair of knife blades 24 and 26 and a means for simultaneously driving the blades horizontally from stationary open positions towards each other edgewise into contact and subsequently reversing their travel directions to withdraw them along the same paths into their original remote starting positions. The drive means is designed so that its components cycle through identical paths once during every such cycle of the knife blades. Preferably the drive means includes a pair of opposed shear arms 28 and 30 with the knife blades 24 and 26 anchored on their free ends. The driven ends of the arms 28 and 30 are pivotally mounted on a single axel shaft 32 which is vertically disposed and has a fixed location. Eccentric means are provided to simultaneously oscillate the arms in opposed horizontal directions through respective arcs of less than 180°. The eccentric means may include connecting rods 34 and 36 pivotally attached at one end to laterally outwardly extending portions of the shear arms and with other ends of the rods rotatably connected to a pair of crank arms 38 and 40 affixed to oppositely rotating synchronously driven shafts 42 and 44. Meshing spur gears 46 and 48 may be keyed to shafts 42 and 44 to provide such synchronization and also a driving connection therebetween. A rotary actuator, such as a rotary hydraulic motor 50, is positively connected to an extension of one of the shafts, for example shaft 44, to rotate this shaft 44 and gear 48 which in turn rotates gear 46 and shaft 42. The motor is continuously energized while the shearing apparatus is in operation.

Control means are provided for regulating the cycle of the drive train. The control means comprises an abutment 52 located on a movable member of the drive train and also includes a cooperating releasable stop means disposed in the travel path of the abutment 52. Preferably the rotatable member is a generally circular plate 54 rigidly attached concentrically to a protruding end of one of the shafts 42 or 44, for example shaft 42. The stop means may comprise the end of a longitudinally reciprocable piston rod 56 rigidly connected to the piston 48 of a double acting hydraulic cylinder 60. The rod 56 extends beyond the end of cylinder 60 into the travel path of the abutment and is preferably oriented in a tangential direction with respect to the travel path of the center of the abutment 52. Normally the piston 58 is at the end of the cylinder 60 adjacent to the plate 54 so that the stop rod 56 is positioned in the path of the abutment thereby firmly restraining the forward movement of the abutment. To reciprocate the stop rod out of the path of the abutment and then reset it in the path of the abutment, a pair of hydraulic lines 62 and 64 enter the cylinder 60 from opposite ends.

Details of the hydraulic system are schematically shown in FIG. 5 wherein reference numeral 70 denotes an hydraulic power source which supplies hydraulic fluid under pressure to a main supply line 72 and then into branch lines 74, 76, and 78, flowing respectively to an accumulator 80, the aforementioned hydraulic cylinder 60 and rotary motor 50. A check valve 82 may be provided in the main supply line between the power source and the first branch line to prevent backflow through the main line. Reciprocation of the piston 58 in cylinder 60 is accomplished by means of a two position valve 84 located across hydraulic lines 62 and 64. In one position a section of the valve having parallel ports is aligned with lines 62 and 64. The other section of the valve provides crossover ports which reverse the flow direction in the lines 62 and 64 when it is positioned in confronting relationship to these lines. One of the two ports in each of the two valve sections is a fluid supply port while the other port returns the fluid to a sump. As shown in the drawing the valve is spring biased into the parallel flow position subject to being switched into its crossover position by means of a solenoid 86 which is energized in response to timing signal synchronized with the reciprocation of the feeder plunger 18. This timing signal may be initiated by timing device 22, such as a drum timer.

During operation the fluid supply to rotary motor 50 of the drive train is maintained constantly under pressure. However, a bypass line 88 with a normally closed manual valve 90 is provided so that the hydraulic pressure on the motor can be relieved by opening the bypass valve 90 thus allowing the motor and the other elements of the drive train to be manually moved in a reverse direction such as might be necessary if the blades became jammed. A deceleration valve 92 may be placed in the return line 93 from the motor 50 to reduce the rotational speed of the motor during the latter portion, for example the last 30° of rotation, of each revolution. This is accomplished by a cam lobe 94 which may be located on a corresponding portion of the periphery of control plate 54. Cooperating with the cam lobe 94 is a cam follower connected to the reciprocable stem of valve 92. A bypass line 96 having a manually adjustable orifice 98 may be provided in the deceleration valve for modulating the flow of hydraulic fluid therethrough. Additional flow control is provided by a manually adjustable orifice 100 located downstream from the deceleration valve 92. On the upstream side of the deceleration valve, a pressure relief valve 102 may be inserted to protect against over pressurization of the fluid lines, such as might occur if the manually adjustable orifices were turned excessively towards a closed position.

While the drawings illustrate a single embodiment towards which the written description is primarily directed, it is to be understood that some of the components and also the way in which they are arranged may be changed without departing from the scope of the invention which is defined in the appended claims.

I claim:

1. A shearing apparatus for sequentially severing gobs of glass from the end of a vertically descending molten stream of glass at precisely controlled uniform intervals, said apparatus comprising: a pair of cooperating knife members mounted on arms for reciprocal travel in arcuate paths of less than 180° in vertically offset adjacent horizontal planes; drive train means for simultaneously reciprocating said knife members towards and away from each other, said drive train means having a plurality of rotatable members including a pair of gears, a rotary actuator, an abutment affixed to one of said rotatable members, a releasable stop means in the path of said abutment; timing means for automatically releasing said stop means and means for automatically resetting said stop means.

2. A shearing apparatus according to claim 1 wherein said releasable stop means comprises a hydraulic cylinder and piston having an axially reciprocable piston rod disposed in a tangential direction with respect to the rotary path of the center of said abutment.

3. A shearing apparatus according to claim 1 wherein said drive train means further includes a cam actuated deceleration valve for reducing the speed of said rotary actuator during a portion of the return stroke of the knife arms.

4. A shearing apparatus for sequentially severing gobs of glass from the end of a vertically descending molten stream of glass at precisely controlled uniform intervals, said apparatus comprising: a pair of cooperating knife members mounted on arms for reciprocal travel in arcuate paths of less than 180° in vertically offset adjacent horizontal planes; drive train means for simultaneously reciprocating said knife members towards and away from each other, said drive train means having a pair of gear assemblies including axle shafts and gears, said gears being in meshing contact with each other; a pair of eccentrics rigidly attached to said pair of gear assemblies, said eccentrics being drivingly connected to said knife member arms, a rotary actuator drivingly connected to one of said gear assemblies, releasable stop means associated with one of said gear assemblies, said stop means including an abutment for stopping the rotation of said gears after each revolution, a longitudinally reciprocable stop rod with an abutment engaging end disposed in the path of said abutment; timing means for automatically actuating the reciprocation of the stop rod out of the path of said abutment and means for automatically resetting said rod into its normal position in the path of said abutment.

5. A shearing apparatus according to claim 4 wherein said releasable stop means comprises a hydraulic cylinder and piston having an axially reciprocable piston rod disposed in a tangential direction with respect to the rotary path of the center of said abutment.

6. A shearing apparatus according to claim 4 wherein said drive train means further includes a cam actuated deceleration valve for reducing the speed of said rotary actuator during the last 30° of the return stroke of the knife arms.

* * * * *